United States Patent [19]

Leasure

[11] 4,025,375
[45] May 24, 1977

[54] METHOD FOR CONTINUOUS WELDING TOGETHER OF PLASTIC SHEETS

[75] Inventor: William C. Leasure, Houston, Tex.

[73] Assignee: Mira-Pak, Inc., Houston, Tex.

[22] Filed: May 23, 1972

[21] Appl. No.: 256,106

[52] U.S. Cl. .................................. 156/79; 156/86; 156/201; 156/203; 156/215; 156/218; 156/229; 156/272; 156/306

[51] Int. Cl.² ........................................ B29D 23/10

[58] Field of Search .............. 156/79, 86, 164, 165, 156/201, 203, 215, 218, 229, 392, 466, 495, 499, 272, 306; 53/28, 280 R, 180, 180 OR

[56] References Cited

UNITED STATES PATENTS

| | | | |
|---|---|---|---|
| 2,899,875 | 8/1959 | Leasure | 53/180 |
| 3,118,800 | 1/1964 | Snelling | 156/201 |
| 3,122,072 | 2/1964 | Monsees et al. | 156/466 |
| 3,223,571 | 12/1965 | Straughan | 156/465 |
| 3,388,017 | 1/1968 | Grimsley et al. | 156/466 |
| 3,466,850 | 9/1969 | Hudson et al. | 53/28 |
| 3,486,424 | 12/1969 | Tanner | 53/28 |
| 3,557,525 | 1/1971 | Bauder | 53/180 |
| 3,563,825 | 2/1971 | Segura et al. | 156/215 |
| 3,661,322 | 5/1972 | Norman | 53/28 |
| 3,729,359 | 4/1973 | Monsees | 156/466 |

*Primary Examiner*—Charles E. Van Horn
*Assistant Examiner*—Basil J. Lewis
*Attorney, Agent, or Firm*—Larson, Taylor and Hinds

[57] ABSTRACT

A method and apparatus for continuous welding together of sheets of the type in which adhesion is derived from the melting and re-hardening of the sheet material itself rather than from an externally applied adhesive. A sheet, formed into a tube with the opposite sides overlapping, is tensioned longitudinally so as to form longitudinally extending stress lines which appear as ripples, at least at the overlapping edges such that the sheets weld at the bottom of the valleys formed by the ripples. As the tensioned sheet moves continuously between a heating element and a backing plate, both of which are stationary relative to the tube forming means, the sheets weld as the material from the sides of the valley of at least one sheet runs to the bottom of the valley, at which point the weld bead is formed, whereby the thickness of the weld bead may be more than twice the thickness of the original unheated sheet material.

17 Claims, 11 Drawing Figures

METHOD FOR CONTINUOUS WELDING TOGETHER OF PLASTIC SHEETS

BACKGROUND OF THE INVENTION

This invention relates to welding of plastic sheet material, and in particular it relates to continuous welding together of sheets of the type which adhere by melting and re-hardening together of the sheet material itself.

It is known to form a strip of packaging material into a tube by passing the strip material over an external former. Such a former is shown in U.S. Pat. No. 2,899,875, issued Aug. 18, 1959. In the tube thus formed, the opposite edges of the sheet overlap and a means must be provided for sealing these edges together to complete the formation of the tube.

In one previous arrangement for sealing these overlapping sheet edges, the strip material is moved continuously and a heating element is applied to the overlapped longitudinal edges of the strip material as the material passes over a backing plate which is stationary relative to the moving film of material. This type of sealing has been found to be highly satisfactory in connection with the sealing of materials wherein an adhesive coating is applied to the facing surfaces of the overlapping edges. However, difficulties have been experienced when attempting to seal together by welding on a continuous basis materials such as polyethylene which do not utilize an adhesive coating but wherein the sheet itself is melted and re-hardened to form a weld connecting the sheets together.

These difficulties are derived from the fact that such self-welding materials such as polyethylene have a melting point temperature very close to the freezing point temperature, i.e. there is very little if any "soft" range. Consequently a small variation in temperature has an appreciable effect on the seal thus formed. Moreover, a certain length of time is required for the molten polyethylene to re-harden and thus complete the bond of the overlapping edges. Thus, in forming a weld of material such as polyethylene or the like, it has previously been necessary to stop the longitudinal movement of the sheet relative to the heating element and backing plate to allow the sheet material to freeze, i.e. harden, as a result of which the welding procedure is no longer truly continuous. If the sheet material is not stopped in this manner, owing to the said certain length of time required for the molten polyethylene to re-harden and thus complete the weld, some of the melted sheet material adjacent the surface of the backing plate, not having sufficient time to re-harden before the sheet material is carried away from the backing plates, will sometimes stick to this backing plate. The effect of this sticking is to separate the sheets at the seal. Also the molten material which sticks to the backing plate comes from the seal, thus further disturbing the seal and causing holes or "holidays" in the seal. In addition, this build-up of material on the backing plate will reduce the efficiency of the backing plate itself as it will no longer be a smooth surface over which the sheet material can easily slide.

In U.S. Pat. No. 3,133,390, one solution to this problem is provided, although this solution is specifically with respect to an interrupted, non-continuous, reciprocating seal packaging machine and relates primarily to thin film on the order of 0.001 inch to 0.008 inch thickness. As disclosed in U.S. Pat. No. 3,133,390, the backing plate is made to travel with the film while the seal is being formed afterwhich the backing plate must be intermittently returned to its original position for a subsequent seal. This intermittent movement is not a disadvantage in a form, fill and seal packaging machine wherein the tubular length of material must be stopped at intervals anyway to fill and transversely seal the individual packages. However, it is a distinct disadvantage in a continuous tube sealing process such as a pipe coating process in which it is desired to move the tube continuously while of course continuously sealing the overlapping edges thereof. In practice, a coated pipe might normally be cut into sections 40 feet in length.

Thus, there exists a need for improvements which will permit continuous sealing of overlapping edges of a tube of continuous length wherein the seal is formed by melting and re-hardening the sheet material itself.

SUMMARY OF THE INVENTION

Thus, it is a purpose of this invention to provide a new and improved method and apparatus for welding sheets of material together whereby the weld may be effected continuously on sheet material of the type wherein the weld is formed by melting and re-hardening together the sheet material itself.

The method and apparatus of the present invention are especially suitable for the continuous formation of tubular lengths of material. Examples of such tubes would include coatings on pipes, continuous tubes to be separated into relatively short sections such as in a packaging machine such as described in my previous U.S. Pat. No. 2,969,627, and other continuous tube applications.

The purpose of the present invention is achieved by tensioning the sheet and directing the first and second overlapping edges between a heating element and a backing plate, both of which are stationary in relation to the moving sheet material. The tensioning is applied such that at least in the vicinity between the heating element and the backing plate whereat the weld is to be formed stress lines are formed in the overlapping edges. When viewed in a cross-sectional plane transverse to the direction of movement, these stress lines appear as ripples, with the weld being formed in the bottom of a valley formed between two adjacent ripples in at least the first of the overlapping edges. Owing to this ripple configuration, when heat is applied to the said first overlapping edge in the vicinity of the valley, the material of the valley melts such that material on the sloping sides thereof flows into the bottom of the valley to provide an ample volume of molten sheet material to form a weld with the second overlapping edge which touches the first overlapping edge, and indeed preferably a weld bead having a thickness more than two times the original unheated thickness of the sheet material may be formed, all of this without melting the second overlapping edge completely through its thickness. Consequently, that side of the second overlapping edge opposite from the first overlapping edge and contacting the stationary backing plate need not become completely molten in order to form a good weld, and hence the material of this second overlapping edge will not stick to the backing plate, even though the material is moving continuously relative to the stationary heating element and backing plate.

One particularly advantageous application of the present invention is for forming a pipe coating. In this case, a pipe to be coated is directed through the opening in the former of the type referred to above and described in U.S. Pat. No. 2,899,875, whereby relative movement is effected by the pipe and the sheet material on the one hand and the former, the heating element and the backing plate on the other hand. The sheet material is advantageously supplied from a supply roll and the tension is provided by strictly controlling the tension of the sheet material as it is unwound from the supply roll. In this manner, the sheet is tensioned across its entire width, and this tension is transmitted to that portion of the sheet material which has passed the former, is thereby formed into a tube, and wherein the opposite edges of the sheet are overlapped to be welded together between the heating element and the backing plate. The applied tension is opposed either by means pulling the coated pipe away from the former (when using a stationary former and a moving pipe) or moving the former, heating element and backing plate in the direction towards the uncoated pipe (when using a moving former and a stationary pipe).

As one example of how the features of the present invention can be used to coat a pipe, a plurality of tubes may be applied in the manner described above, to provide a multi-layer wrapping on the pipe with the space between layers filled with a suitable filling material, such as a multi-layer wrapping being constructed to serve one or more of a plurality of purposes such as protection from galvanic attack, weighting, heat insulation, padding, shielding, etc.

Since it is desirable in practicing the present invention that the side of the overlapping edge immediately adjacent the backing plate not be melted completely through, it is particularly advantageous to apply the features of the present invention to a relatively thick sheet material, although it will be understood that the basic features of this invention are also applicable to relatively thin sheets if the operating conditions are adequately controlled. For example, when coating a relatively large diameter pipe, it is contemplated that the sheet material forming the coating for such a pipe might be on the order of at least 0.020 inch.

The specific heating temperature will of course depend on many factors such as the specific sheet material used, the speed of travel and the thickness thereof. However, it will be understood that given the teachings of the present invention and said basic operating conditions, one can then establish the appropriate temperature such that the appropriate degree of melting of the overlapping edges, as described above, will occur. Indeed, for a given set of operating conditions, the temperature may be varied to vary the quantity of sheet material flowing from the sloped sides of the valley down to the bottom of the valley. In some cases, a high flow of material and thus a very heavy welded bead at the valley may be desired, while in other cases it may be preferable to limit the flow, even though this limits the quantity of sheet material available at the valley at which the bead is formed.

Thus, it is a purpose of this invention to provide a new and improved method and apparatus for welding together sheets of material.

It is another object of this invention to provide a new and improved method and apparatus for continuous welding together of sheets of material of the type wherein adhesion is accomplished by melting and re-hardening the sheet material itself.

It is another object of this invention to provide a new and improved method and apparatus for continuously welding together sheets of the type which adhere by melting and re-hardening, whereby the sheets are permitted to move continuously in relation to a stationary heating element and a stationary backing plate.

It is another object of this invention to provide a new and improved method and apparatus for continuous sealing of overlapping sheet material by applying tension to the sheet material to form stress lines therein which appear as ripples having valleys, the overlapping sheets are welded, material flows towards the bottom of the valley, thus increasing the material available at the weld.

It is another object of this invention to provide a new and improved method and apparatus for coating a pipe.

It is another object of this invention to provide a new and improved apparatus for continuously sealing overlapping edges of a pipe coating formed from a sheet of material.

It is another object of this invention to provide a new and improved method and apparatus for sealing together overlapping edges of a pipe coating formed from a sheet wherein tension is applied to the sheet to form in at least the overlapping edges stress lines having a configuration of ripples with a valley therein which facilitates forming of said seal while the tubular material moves continuously relative to the heating element and the backing plate.

Other objects and the advantages of the present invention will become apparent from the detailed description to follow, together with the accompanying drawings.

BRIEF DESCRIPTION OF THE DRAWINGS:

There follows a detailed description of a preferred embodiment of the invention to be read together with the accompanying drawings.

FIG. 3 is a cross-sectional view of FIG. 1 taken along line 3—3 and on an enlarged scale.

FIG. 4 is a sectional view taken along line 4—4 of FIG. 1 and on a greatly enlarged scale like that of FIG. 3a.

FIG. 5 is a cross-sectional view taken along line 5—5 of FIG. 1 but on a greatly enlarged scale like FIG. 3a.

Figure 1:
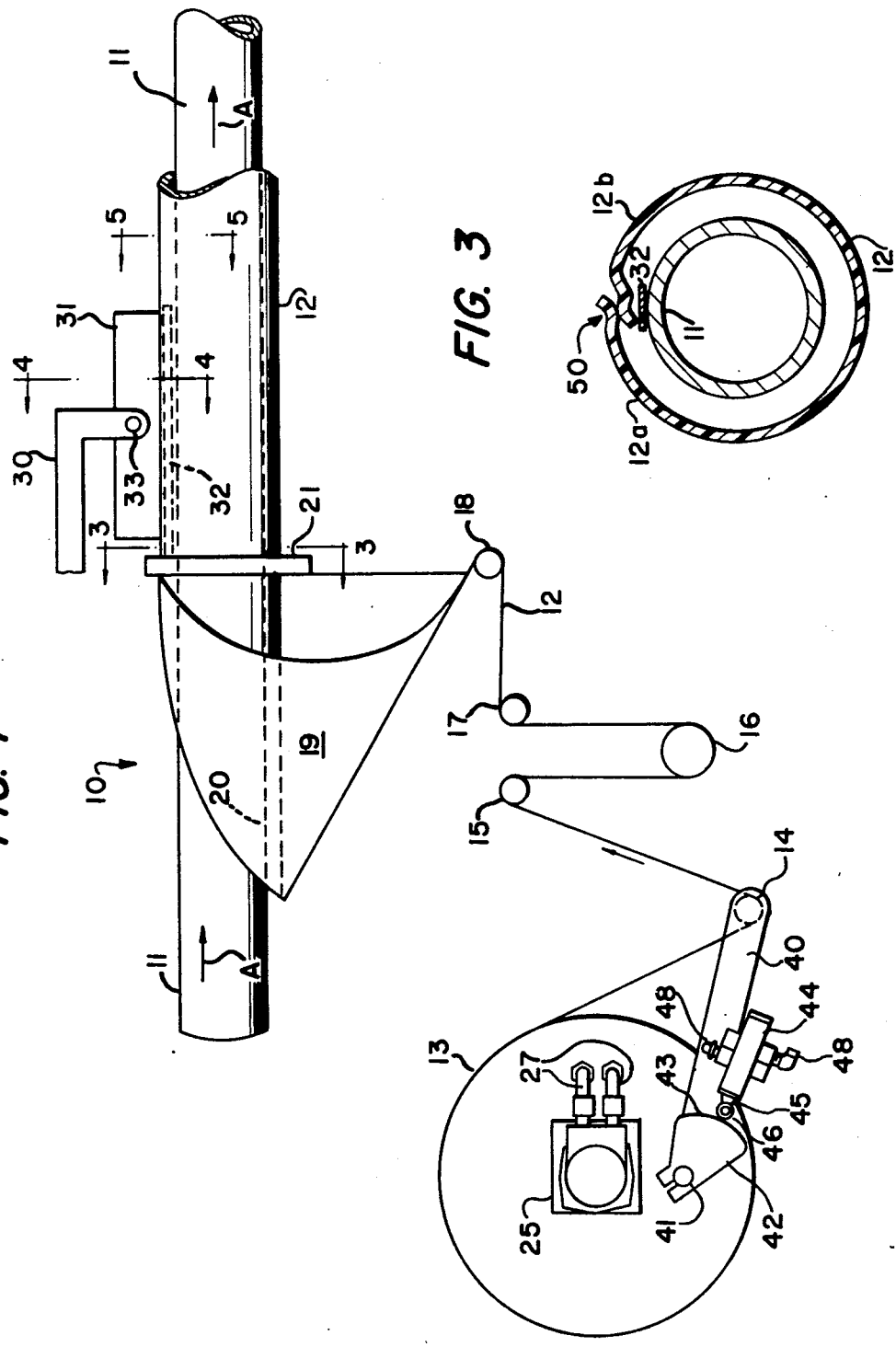
FIG. 1 is a diagrammatic view illustrating a portion of a pipe coating apparatus utilizing the features of the present invention.

DETAILED DESCRIPTION OF THE PREFERRED EMBODIMENTS:

Referring now to the drawings, like elements are represented by like numerals throughout the several views.

Figure 2:
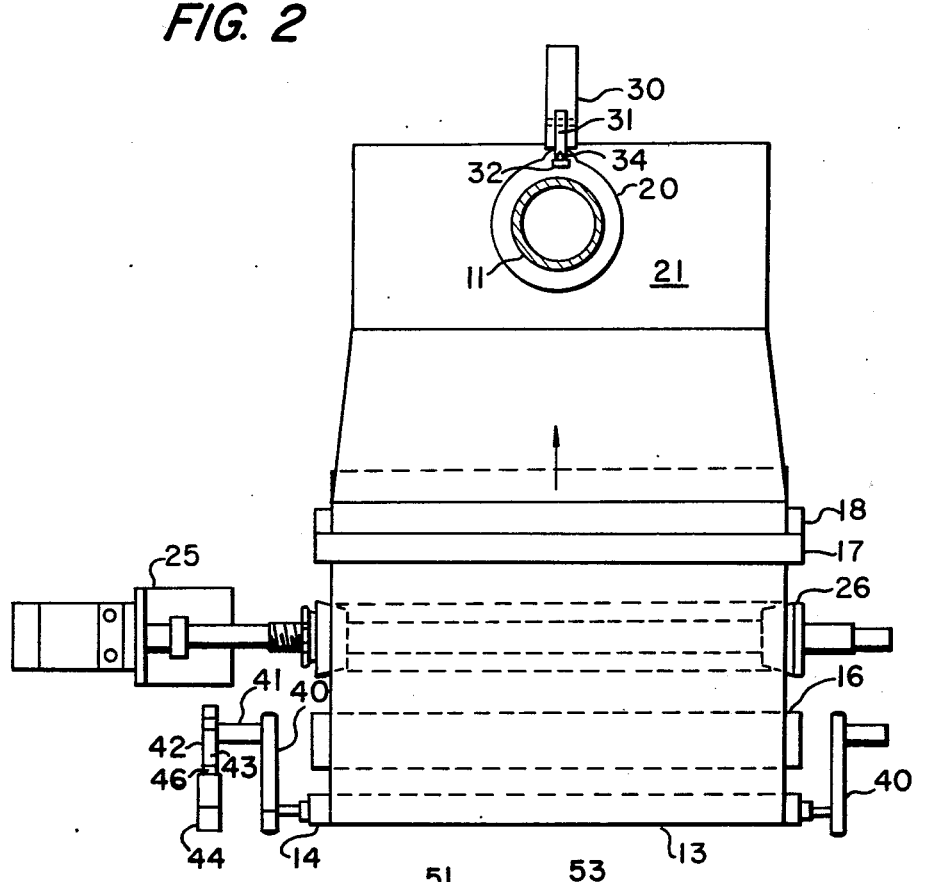
FIG. 2 is an elevational view of FIG. 1, viewed from the righthand side thereof.

FIGS. 1 and 2 illustrate a portion of a pipe coating apparatus 10. A pipe 11 to be coated is moved in the direction of the arrows A as a coating material 12 is applied therearound. This coating material 12 is supplied from a roll 13 via tension sensing roller 14 and idler rollers 15, 16, 17 and 18, from the latter of which the sheet material 12 is formed into a tube on former 19. The sheet material passes up over the back of former 19 and then into the opening 20 thereof through which transition it is formed into a tube with the sheet edges overlapping at the top thereof as shown for example in FIG. 3.

In the illustrated embodiment, the former 19 is connected to a base 21. A backing plate 32 is fixed to the base 21 and extends therefrom in the direction of movement of the tube of coating material 12.

Fixed with respect to the former is a yoke 30 having a pin 33 and extending therethrough (see FIG. 4) connecting it to a heating element 31. This heating element 31 is spaced from the backing plate 32 so as to cause the two overlapping edges of tubular sheet material 12 to contact each other as they pass therebetween. Preferably, however, this element heats by radiation without applying pressure to the sheet material.

The sheet material 12 is placed under tension in its longitudinal direction of travel. In the preferred embodiment this tension is created by using a hydraulic fluid powered drive 25 to unwind the sheet material from roll 13 and supplying the hydraulic fluid to this motor in a controlled manner through fluid lines 27. This flow of hydraulic fluid is controlled by a sensing arm 14 which is connected via pin 41 to a cam element 42 having a curved cam surface 43. Riding against cam surface 43 is a roller 46 of a piston 45 within the cylinder 44. As the roller 14 moves upwardly and downwardly in response to variations in the tension in the unwinding sheet material 12, the cam 43 will move the roller 46 in and out relative to valve 44. This in turn controls the opening through the valve 44 thus varying the flow of hydraulic fluid through lines 48 which lines are in turn connected to valves in a manner (not shown) for controlling the flow of hydraulic fluid to the lines 27. Pneumatic or electrical means can also be used to apply tension to the sheet material 12.

While in the illustrated embodiment, the pipe 11 and its tubular coating are shown moving in relation to a stationary former, heating element, back-up plate, and sheet material supply means, it is of course understood that the pipe may remain stationary while the former, the back-up plate, the heating element and the sheet material supply means may all be mounted on a carriage which moves as a unit to the left in FIG. 1. For example, in coating a short length of pipe, one would obviously bring the short length to a stationary apparatus and move the pipe therethrough. However, in other cases it may be necessary to coat a very long stationary pipe. In this case, one would normally bring the apparatus to the pipe and move it therealong.

In the figures, a gap is shown between the outside of pipe 11 and the interior of tubular coating 12. In a manner to be explained in greater detail below, downstream from the forming and sealing apparatus means are provided for fitting the coatings snugly. For example, the coating 12 could be shrunk onto the pipe 11 or if desired a filling material could be inserted between the pipe 11 and the coating material 12.

Figure 3A:
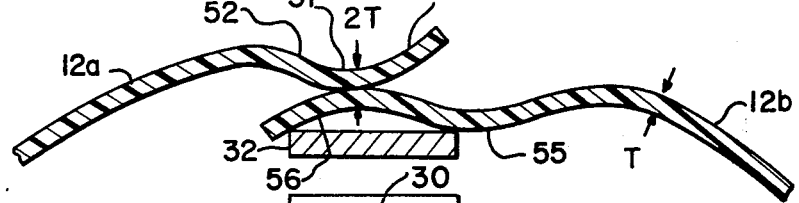
FIG. 3a illustrates a portion of FIG. 3 on a greatly enlarged scale.
Figure 4:
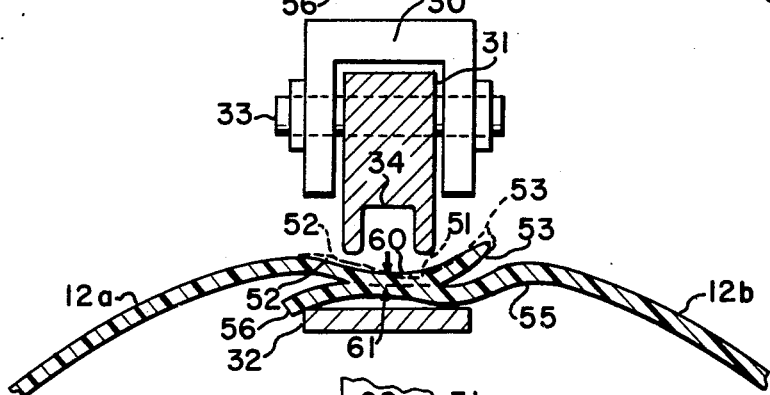
Figure 5:
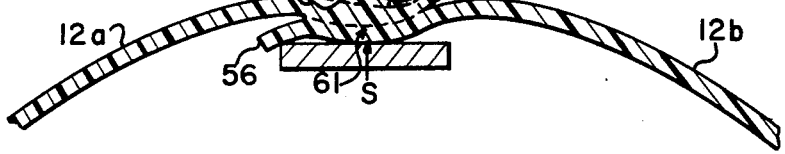
Figure 6:
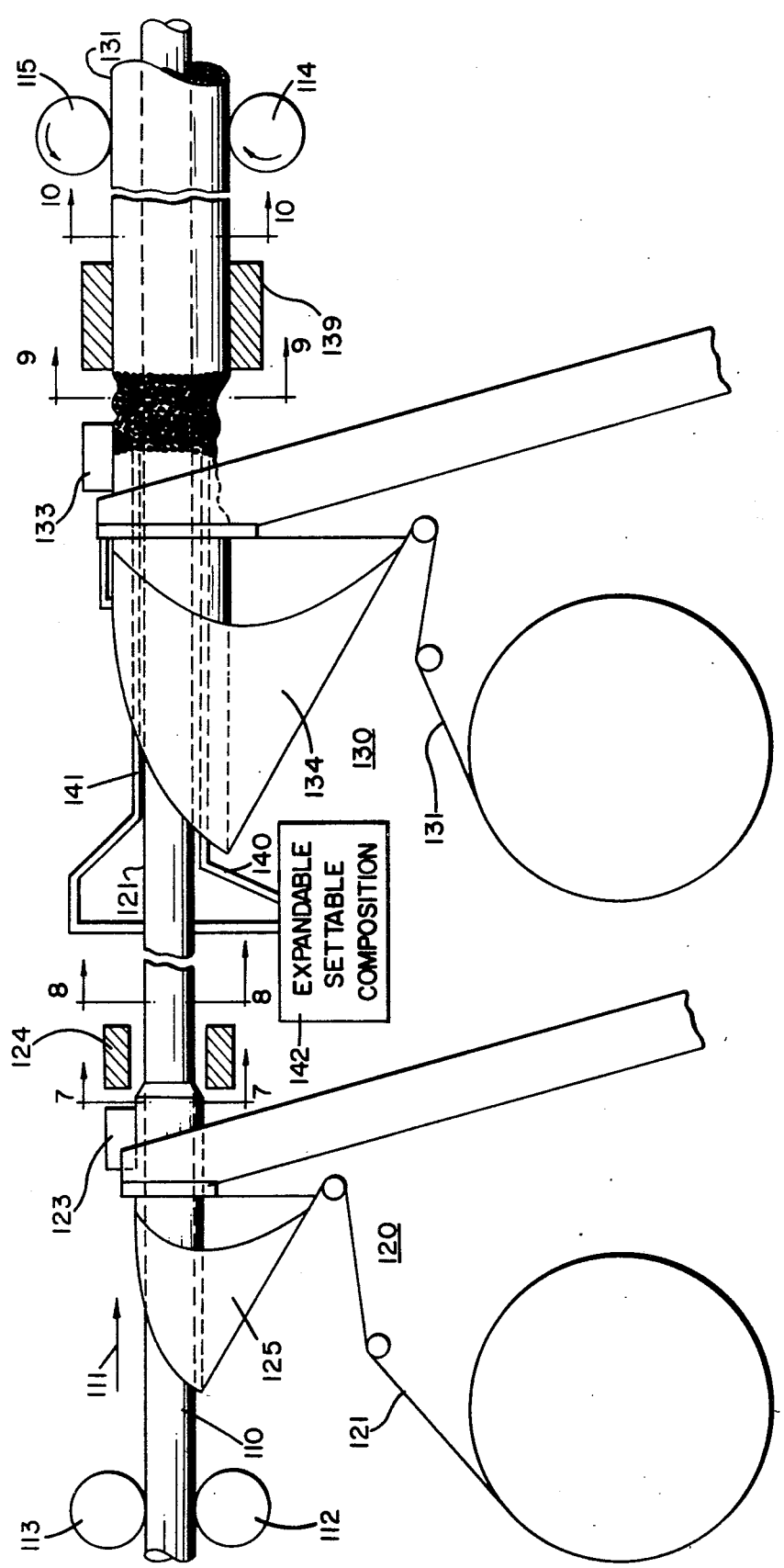
FIG. 6 is a diagrammatic view of apparatus utilizing the features of the present invention for applying a multi-layer wrapper to a pipe.
Figure 7:
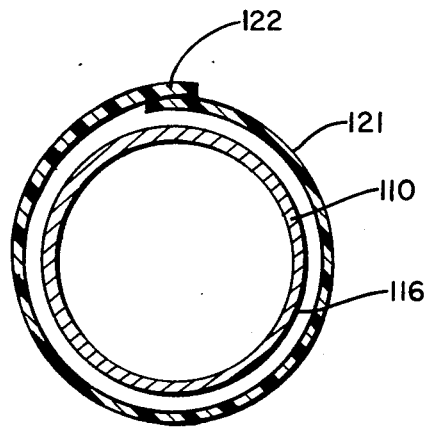
FIGS. 7, 8, 9 and 10 are cross-sectional enlarged views of a pipe shown in FIG. 6, taken along the lines 7—7, 8—8, 9—9, and 10—10, respectively, of FIG. 6.
Figure 8:
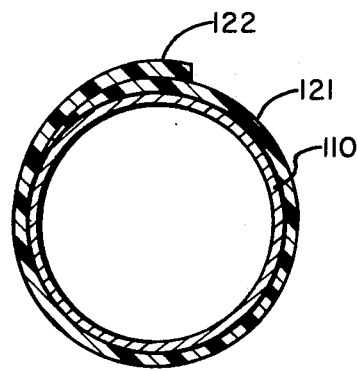
Figure 9:
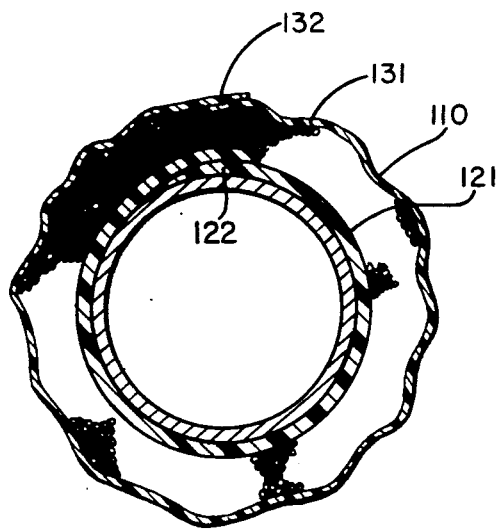
Figure 10:
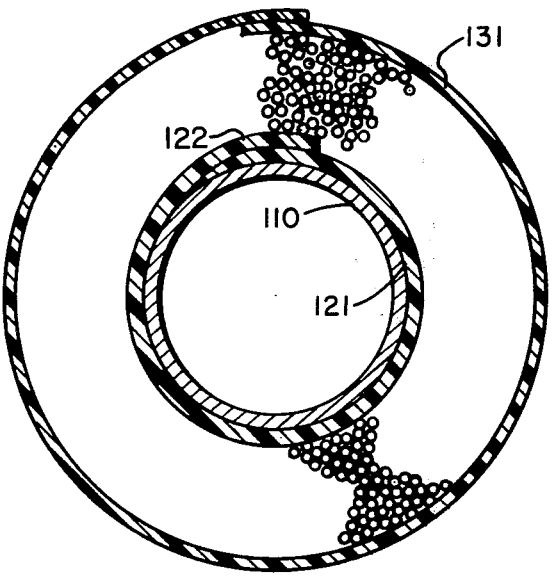

FIGS. 3–5 illustrate the method and apparatus of the invention with respect to the actual sealing of the overlapping edges of the tube 12. Because the sheet material is placed in tension longitudinally, longitudinally extending stress lines which appear in transverse cross-section as ripples formed about the circumference thereof in the vicinity between the heating element 31 and the backing plate 32. Referring to FIG. 3, some of these ripples are shown at the top thereof in the vicinity where the opposite edges of the sheet overlap. If, as disclosed in the preferred embodiment, the sheet is placed in tension across its entire width, then these ripples will actually extend all about the periphery of the tube 12 in FIG. 3. However, because of the heating in the vicinity between the elements 31 and 32, the ripples tend to be accentuated at that location. In any event, since only those ripples in the vicinity of the overlapping edges are relevant here, only such ripples have been shown herein. It follows of course that in lieu of the tensioning means described herein, other tensioning means may be provided which tensions the sheet 12 only at the edges thereof such that ripples will be formed only at the overlapping edges.

In FIG. 3, the opposite edges 12a and 12b overlap in the area indicated by the numeral 50. FIG. 3a illustrates the overlapping area 50 in greater detail. The edge 12a forms a ripple having a valley 51 formed between sloping wall 52 which leads towards the remainder of the sheet and sloping wall 53 which leads towards the very outer edge of the sheet. Similarly, the other edge 12b forms a valley 54 having a slope 55 extending towards the remainder of the sheet and a slope 56 extending towards the very outer edge of edge portion 12b. As illustrated in FIG. 3a, the overlapping edges are urged into engagement with each other under the action of backing plate 32 and the heating element 31, but not necessarily with pressure. Where these two overlapping edges touch, the thickness is of course equal to 2T, "T" being equal to the thickness of the original unheated sheet material.

FIG. 4 illustrates the overlapping edges as they pass into the area between the heating element 31 and the back-up plate 32. The heating element has a tunnel 34, the legs of which hold the sheets together and which encloses the radiant heating elements. In FIG. 4, the dotted lines indicated 51, 52 and 53 represent the original position of these elements as shown in FIG. 3a. However, now that heat is applied, primarily to the upper edge portion 12a and of course to some extent to the lower edge portion 12b, sheet material from the portion 12a flows from the slopes 52 and 53 down into the valley 51 providing additional material 60 at this location. Meanwhile, at least the upper surface of portion 12b is melted and fuses with the upper portion 12a at area 61. However, the lower surface of edge portion 12b is not molten and hence the material therefrom does not stick to the backing plate 32.

The final seal is indicated in FIG. 5. Again, the original position of the valley 51 and the two slopes 52 and 53 is shown in dotted lines. It is seen that a relatively large quantity of material has flowed from the slopes 52 and 53 into the valley to form the additional material 60 at the center of the weld. To the extent that molten material has been taken from slopes 52 and 53 to provide the excess material in valley 51, there is no detrimental effect on the seal at slopes 52 and 53. In the case of slope 52, the overall thickness of the seal in this area has been increased as the area 61 at the former interface between the two edge portions 12a and 12b has extended laterally. Loss of material from slope 53 is of no particular consequence since this merely is a superfluous edge. The total thickness of this seal S is now greater than 2T, i.e. greater than twice the thickness of the original material.

To summarize, although the overlapping edges 12a and 12b move continuously with respect to the heating element 31 and the back-up plate 32, the fact remains that with the weld formed between these overlapping edges by melting and re-hardening of the sheet material itself, the final seal actually has a thickness more than twice the thickness of the original unheated sheet material, and no molten material sticks to the stationary back-up plate.

This invention is particularly concerned with sheet materials which melt and re-harden to form a seal. The preferred materials are thermoplastic resins. Preferred thermoplastic resins include the following: polyolefins, polypropolene, polyethylene, copolymers thereof and the like; vinyls such as polyvinyl chloride, polyvinylide chloride, polystyrene and copolymers thereof; cellulose resins such as cellulose acetate, cellulose acetate butyrate and the like; polyamides; and polyesters.

FIGS. 6-10 illustrate the application of the present invention to a method and apparatus in which continuous coatings are continuously applied to a pipe.

A metal pipe 110, in this case a steel pipe used for conveying oil from offshore oil drilling operations to shore, is continuously moved to the right in the sense of the drawings in the direction of arrow 111 by conventional pipe advancing means, in this case a pair of drive rolls 112, 113 and a pair of idler guide rolls 114, 115 rotating in the directions indicated by arrow.

On moving to the right, pipe 110 is first moved past a first plastic film wrapping station 120 where a first elongate plastic film 121 is applied adjacent the outer surface 116 of pipe 110 such that an elongate overlap seam 122 is formed by the film extending longitudinally of the pipe. After film 121 is wrapped around the pipe, seam 122 is sealed in the manner described above with respect to FIGS. 1–5, the heating element being shown schematically at 123. The pipe is then passed inside a tubular heater 124 which heats film 121 sufficiently to shrink film 121 tightly against outer surface 116 of pipe 110. The pipe is thus provided with a first plastic film layer 121 tight against outer surface 116 of metal pipe 110 and including a longitudinal seam seal extending lengthwise of the pipe. The primary purpose of the film 121 is to provide protection against galvanic attack of pipe 110 and several plastic films are suitable for this purpose.

Plastic film 121 is wrapped about pipe 110 by means of a suitable former 125 similar to former 19. Preferably the film 121 is applied loosely about pipe 110 and is shrunk closely thereagainst, after seam 122 is formed, by a conventional shrinking means such as tubular heater 124.

One or more inner wrappings of plastic film can be applied to pipe 110. In the drawings, only one inner wrapper is illustrated. However, it is to be understood that only one or more additional plastic wrappings may be applied as desired. These additional wrappings are preferably applied in the same manner as film 121.

After film wrapping 121 is provided on pipe 110, the wrapped pipe is passed through a second film wrapping station 130 similar to first station 120 where a second elongate plastic film 131 is applied adjacent the outer surface of film 121 with a space being formed between the first and second wrappings. A second elongate overlap seam 132 is provided in film 131 in the same manner as described above with respect to FIGS. 1–5.

The diameter of the tube formed by sealed film 131 is considerably larger than that formed by shrunk film 121 and thus an annular space is formed between the inner and outer plastic film wrappings. As wrapper 131 is being formed, a settable, expandable liquid filler composition is introduced through one or more nozzles 140, 141 from reservoir 142 into the annular space and, after seam 132 is sealed, the filler composition is caused to expand outwardly against outer wrap 131. Outer wrap 131 is thus caused to assume a position concentric to pipe 110 and inner wrap 121 due to the uniform fluid pressure exerted by expansion of the filler composition. In the illustrated embodiment, the tips of nozzles 140, 141 are downstream of sealer 133 and therefore the filler is introduced into the annular space after sealing wrapping 131. However, the filler can be introduced simultaneously with sealing or before sealing provided that expansion of the filler is sufficiently slow or delayed that expansion against wrapping 131 will not commence until after wrapping 131 is sealed. For example, expansion of the filler composition may be initiated by heat which may be applied after sealing seam 132. In any event, the filler composition is urged outwardly against sealed wrapping 121 and the assembly is then passed through an orifice 139 of predetermined size to restrain expansion of the filler. The filler composition is caused to set in its expanded condition within orifice 139 and thus the filler in the pipe emerging from orifice 139 is expanded and set sufficiently solid such that substantially no further expansion takes place. There is thus provided a metal pipe provided with a multi-layer protective plastic wrapping including a first plastic film layer contiguous with the outer surface of the pipe and including a longitudinal seam seal extending lengthwise of the pipe, a second plastic wrapping like the first and concentric therewith, the annular space between the wrappings being filled with an expanded, set, filler composition.

The entire apparatus may be provided in a fixed position, or alternatively, the apparatus may be moved relative to a stationary pipe. The nature of the filler composition can vary widely, its characteristics being physical rather than chemical, to satisfy the desired purposes of galvanic or cathodic protection, weighting, heat or other insulation, padding, shielding, etc. In any event, however, two characteristics are essential: settability and expandability under conditions harmless to the enveloping plastic films. Several conventional compositions such as foam forming compositions are quite suitable. For example, compositions containing expandable microballoons are suitable as well as conventional plastic foam-forming compositions such as polyurethane foam-forming compositions. These compositions all expand and set under conditions harmless to the assembly. The compositions may be caused to set by applied heat or under ambient temperature conditions with the addition of catalysts injected into the composition preferably prior to emission from conduits 140 and 141. The expanded composition provides heat insulation due to the provision of gas pockets during its expansion. Synthetic resin foam-forming compositions, such as polyurethane foam-forming compositions are preferred. The foams may be either primarily open celled or primarily closed celled and both rigid and flexible foams may be used. Where weighting is necessary, for example to make a pipe heavy for sinking in water, heavy fillers such as metal powders can be used.

Although the invention has been described in considerable detail with respect to a preferred embodiment thereof, it will be apparent that the invention is capable of numerous modifications and variations apparent to those skilled in the art without departing from the spirit and scope of the invention.

I claim:

1. A method of sealing together first and second adjacent overlapping edges of sheet material of the type joinable by welding, comprising: tensioning the sheet material in the direction parallel to said edges to form in at least said first overlapping edge stress lines which form a valley opened upwardly and extending substantially parallel to said edges and such that the ridge on the opposite side of the sheet from the valley protrudes downwardly towards and touches the second sheet, and applying heat to said overlapping edges to melt the said first overlapping edge to weld the overlapping edges in the vicinity of said valley by causing the melted sheet material of the first overlapping edge to flow down the sides of the valley to thicken the overlapping edges at the bottom of the valley at the weld.

2. A method according to claim 1, wherein both said overlapping edges are tensioned, and the valleys of the overlapping edges touch each other.

3. A method according to claim 1, said sheet material being a sheet formed into a tube, the opposite sheet edges constituting said overlapping edges, and wherein the steps of tensioning comprises tensioning the sheet in said direction of the edges across the entire width thereof.

4. A method according to claim 3, wherein the heat is applied only to the surface of the overlapping edges adjacent the first overlapping edge and including supporting the opposite side of the overlapping edges by a backing surface which is stationary relative to the forming means.

5. A method according to claim 1, wherein the amount of material which flows is dependent on the heating temperatures, and wherein said heating step comprises heating the overlapping edges to a temperature such that sufficient material flows to form at the weld a thickness more than the total original unheated thickness of the two overlapping edges.

6. A method according to claim 1, wherein said sheet material is polyethylene.

7. A method according to claim 1, wherein the heating step comprises heating the overlapping edges with a heating element on the side of the overlapping edges adjacent the said first overlapping edge, and including supporting the opposite side of the overlapping edge with a supporting means stationary axially relative to the heating element.

8. A method according to claim 7, including moving the overlapping edges continuously axially relative to the heating element and the supporting means.

9. A method according to claim 8, including applying sufficient heat to form at the weld sheet material having a thickness more than twice the thickness of the original unheated sheet material.

10. A method according to claim 7, said step of heating comprising heating with radiant energy without the application of pressure to the overlapping edges.

11. A method according to claim 1, wherein the heat is applied on the surface of the overlapping edges at which the said one overlapping edge with the valley is located, and including supporting the opposite surface of the overlapping edges with a support means which is stationary relative to the forming means.

12. A method of coating a pipe with a sheet material comprising the following steps:
with a tube forming means, forming a length of sheet material into a tube of coating material surrounding the pipe to be coated, such that the opposite edges of the sheet overlap circumferentially on top of the tube,
establishing relative axial movement between the pipe and the tube forming means such that additional pipe length is presented to the forming means to receive newly formed lengths of the tube of coating material,
tensioning said tube of coating material in the said axial direction by a sufficient amount to form in at least the upper one of said overlapping edges stress lines which form a valley open upwardly and extending parallel to the said axis,
and heating the overlapping edges to heat at least the said upper overlapping edge to the melting point of the sheet material, and welding the overlapping edges together in the vicinity of the said valley by causing the melted sheet material of the first overlapping edge to flow down the sides of the valley to thicken the overlapping edges at the bottom of the valley at the weld.

13. A method according to claim 12, including delivering the sheet material from a supply roll to said forming means, and wherein the step of tensioning includes applying tension to the sheet material between said supply roll and said forming means.

14. A method according to claim 13, wherein said tension is applied across the entire width of the sheet such that said valleys are formed in both of said overlapping edges.

15. A method according to claim 12, wherein the amount of material which flows is dependent on the heating temperature and wherein said heating step comprises heating the overlapping edges to a temperature such that a sufficient amount of the sheet material flows to form at the weld a thickness more than the total original thickness of the two overlapping edges.

16. A method according to claim 12, wherein said sheet material is polyethylene.

17. A method according to claim 12, including providing first and second of said tubes concentrically on a pipe, with an annular space therebetween, shrinking said first tube to bring said first tube into close adjacency with the outer surface of said pipe and then providing said second tube therearound, introducing a settable, expandable, filler composition into the annular space between said first and second tubes to form a tubular layer of settable filler between said tubes, permitting said settable filler composition to expand and set to form a set, expanded, annular tubular layer of filler composition around said first tube and bringing the second tube into close adjacency with said tubular layer of filler composition thereby providing a pipe encased in a multi-layer protective wrapping.

* * * * *